O. S. SELLS.
BUTT REMOVER.
APPLICATION FILED AUG. 23, 1919.
1,412,543.
Patented Apr. 11, 1922.
2 SHEETS—SHEET 1.
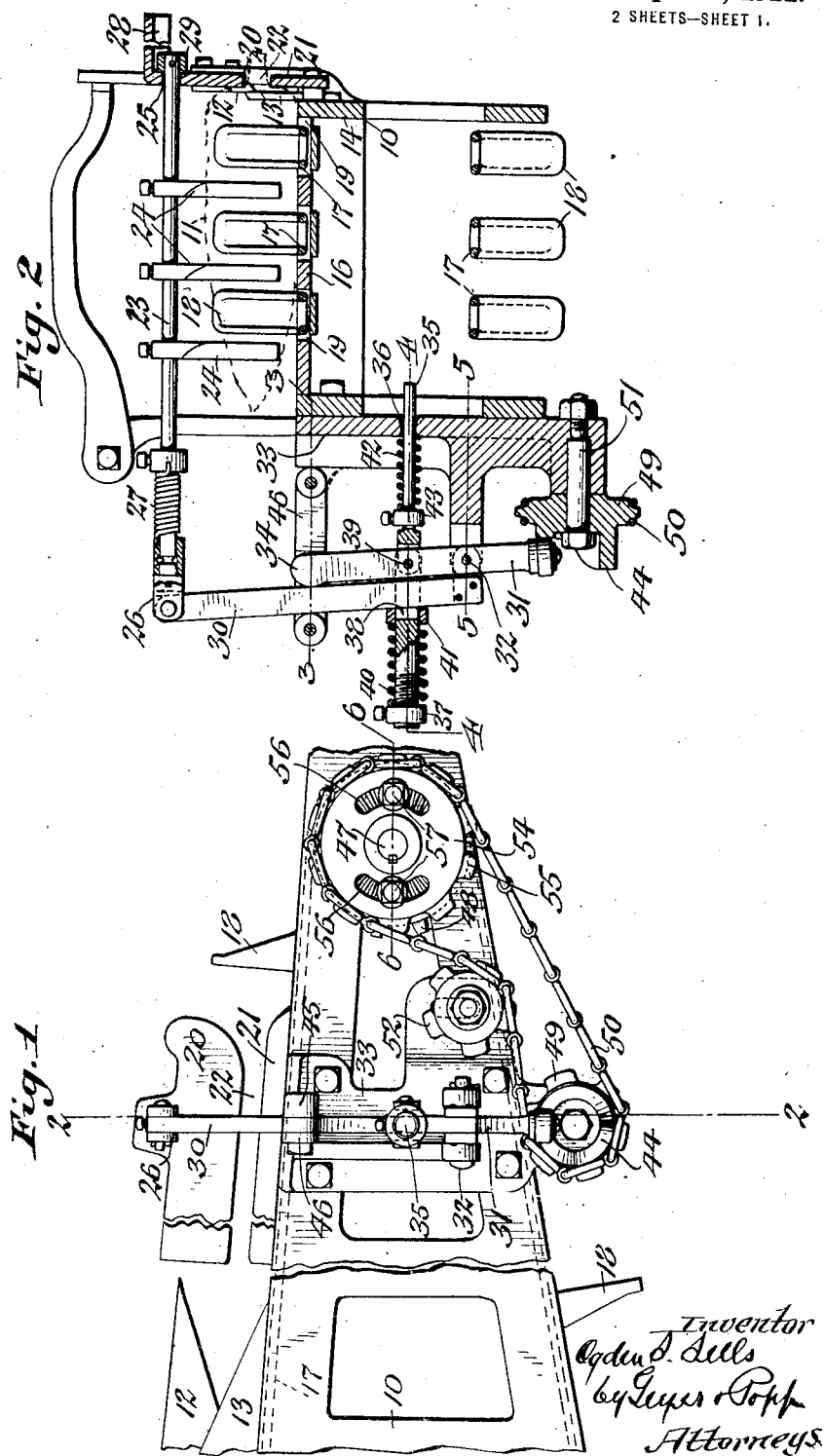

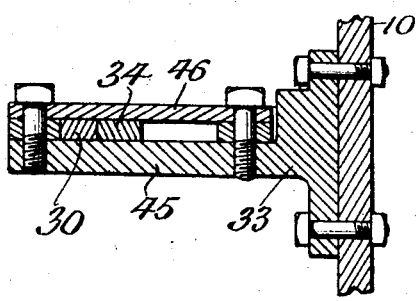
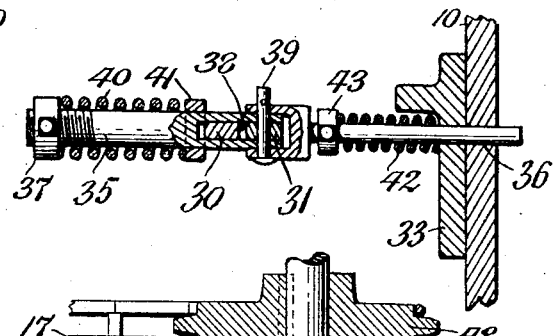
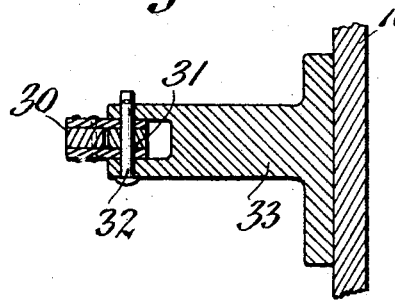
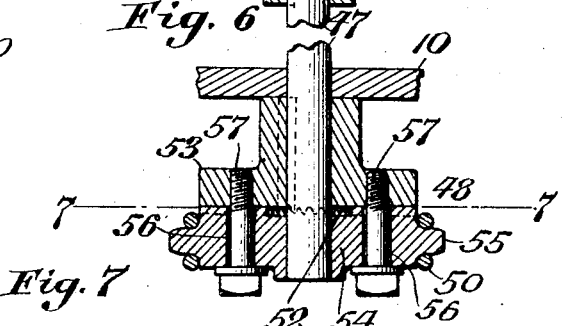
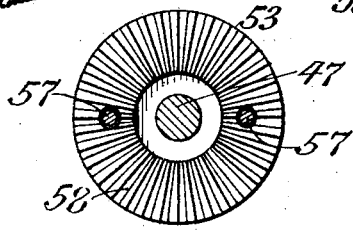
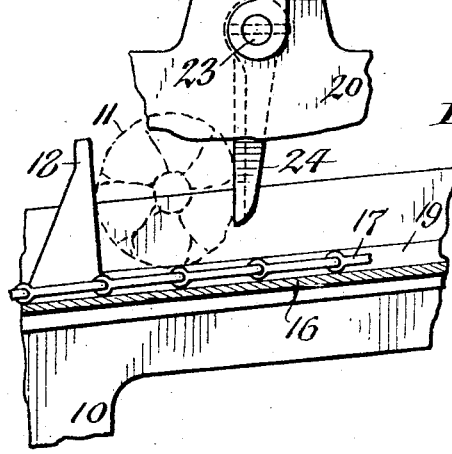
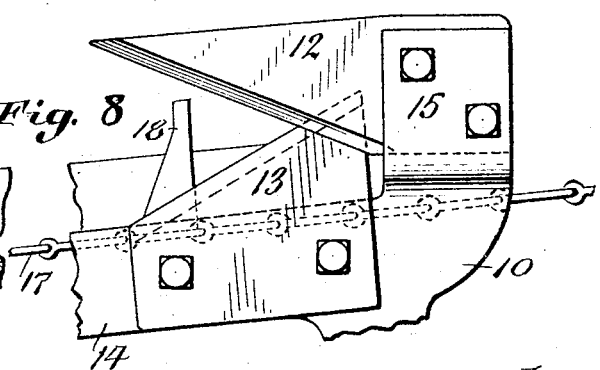

UNITED STATES PATENT OFFICE.

OGDEN S. SELLS, OF BUFFALO, NEW YORK, ASSIGNOR TO PEERLESS HUSKER COMPANY, OF BUFFALO, NEW YORK, A COPARTNERSHIP.

BUTT REMOVER.

1,412,543.  Specification of Letters Patent.  Patented Apr. 11, 1922.

Application filed August 23, 1919. Serial No. 319,298.

*To all whom it may concern:*

Be it known that I, OGDEN S. SELLS, a citizen of the United States, residing at Buffalo, in the county of Erie and State of New York, have invented new and useful Improvements in Butt Removers, of which the following is a specification.

This invention relates to a butt remover for corn huskers and has for its objects the production of an apparatus for this purpose in which the cutter is maintained in a definite relation to the gage device and thus insures severing the butts of the ears of corn uniformly and at a definite line relatively to the kernels, so as to properly remove the stub and loosen the husks without wasting any kernels; also to provide improved means for limiting the backward swinging motion of the shifting rod and fingers of the ear placing or positioning device and prevent dislocation of the same relatively to the ears of corn and other working parts of the machine; also to provide efficient means for preventing breakage of any parts if the ear placing device should meet with undue resistance while in operation, and also to permit of accurately adjusting the timing of the ear conveying mechanism and the ear positioning device, so as to avoid any conflict between the same and possible injury to the machine.

In the accompanying drawings:

Figure 1 is a fragmentary side elevation of a butt removing apparatus for corn huskers embodying the preferred form of my invention. Figure 2 is a cross section of the same taken on line 2—2, Fig. 1. Figures 3, 4, 5 and 6 are horizontal sections, on an enlarged scale, taken on the correspondingly numbered lines in Figs. 1 and 2. Figure 7 is a longitudinal section taken on line 7—7, Fig. 6. Figure 8 is a fragmentary side elevation of the cutter and adjacent parts of the machine viewed from the side opposite to Fig. 1. Figure 9 is a fragmentary side elevation, partly in section, of the ear positioning device and adjacent parts viewed from the side opposite to Fig. 1.

Similar characters of reference indicate corresponding parts throughout the several views.

10 represents the main frame of the machine which may be of any suitable construction to support the several working parts of the machine.

On one side of the rear part of the frame is mounted the cutter whereby the butt ends of the ears of corn 11 are cut from the bodies thereof for the purpose of severing the stubs or stems therefrom and also loosening the husks adjacent to the rearmost kernels of the ears. This cutter may be variously constructed but, as shown in the drawings, the same consists of upper and lower blades 12, 13, which have inclined cutting edges arranged to converge rearwardly so that when the butt end of an ear is moved against these cutting edges the same will be severed from the body of the ear. In order to positively retain these blades in a definite position relatively to each other and insure proper trimming of the ears both of these blades are connected directly to an integral part of the main frame which carries the means whereby the ears are propelled past the cutter and the means whereby the same are gaged or positioned preparatory to being cut. For this purpose the lower blade 13 is secured to the rear part of a longitudinal side bar 14 of the main frame and the upper cutter is secured to a bracket 15 projecting upwardly from the rear part of this bar, the side bar 14 and the bracket 15 forming an integral part of the main frame, as shown in Fig. 8.

The ears of corn which are to be trimmed preparatory to being husked are placed on the front part of a table 16 where the same are engaged by a longitudinal conveyer which moves the ears past the positioning means and the end or butt cutter. In its preferred form this conveyer includes a plurality of longitudinal belts 17 arranged side by side and movable forwardly with their operative upper stretches and each having a plurality of laterally projecting propelling wings 18 which are arranged in grooves or slots 19 in the table and engage with the rear side of the ears of corn.

The ears of corn are carried forwardly by the conveyer in a crosswise position and before reaching the cutter the same are moved transversely to this conveyer and gaged by a positioning or placing device so that the ears are severed properly at the butt ends thereof. In its preferred form this positioning device is constructed as follows:

20, 21 represent the upper and lower longitudinal bars of a gage which are suitably mounted on the main frame and form a longitudinal slot 22 therebetween. These bars are arranged slightly outside of the cutting line of the cutter, so that when an ear is engaged at its butt end with the gage bars and its stub projecting through the slot between the same and then moved forwardly past the cutter, the butt end of the ear will be severed from the body the requisite extent.

The means whereby the ears are moved crosswise of the conveyer and against the gage includes a stuffing rod 23 arranged horizontally and transversely above the path of the ears and provided with a plurality of shifting fingers 24 which are adapted to project downwardly therefrom into the path of the ears of corn and to be engaged thereby. The shifting rod is capable of rotation and also reciprocation lengthwise of its axis and for this purpose the same is guided at one end in an opening 25 in the upper guide bar, while its opposite end is journaled in a transversely reciprocating head 26 but compelled to move with the latter horizontally and transversely of the conveyer. The shifting rod and fingers are yieldingly held in a position in which the latter depend from the rod, into the path of the ears of corn, this being preferably accomplished by a spring 27 surrounding the rod and connected at one end thereto while its opposite end is connected with the shifting head. As the ears during their forward movement engage with the fingers the latter are shifted sidewise and carry the ears with their butts against the gage and at the same time the fingers are lifted by the ears until the latter clear the same, after which the fingers are again returned to their normal pendant position ready to be engaged by the next ear. In order to positively arrest the return swinging motion of the fingers so that they always stand in a definite position relatively to the path of the ears a stop device is provided which preferably consists of a fixed stop shoulder 28 arranged on the upper gate bar and a stop arm 29 arranged on the shifting arm and adapted to slide on said shoulder and also arrest the return movement of the fingers when the latter reach a position perpendicular to the path of the ears of corn as the same are moved forwardly by the conveyer. This means of arresting the return movement of the finger will not wear unduly by continued hard usage and therefore insures proper gaging of the ears without requiring frequent adjustment or repairs.

The reciprocating motion of the shifting rod and the parts associated therewith is produced by means which are so constructed that when this rod or the fingers mounted thereon should strike an obstruction or meet with unduly strong resistance, this actuating device will yield and thus avoid breaking of parts or clogging of the machine. This condition is liable to occur when setting up the machine or if the parts become loose and out of time, in which case the fingers of the shifting rod during their transverse forward and backward movement are liable to strike the wings of the longitudinal conveyer instead of clearing the same. The preferred means for accomplishing this purpose consists of means which includes an upright rock lever having an upper arm 30 and a lower arm 31, said upper arm being pivoted at its lower end by a pin 32 on a bracket 33 forming part of the main frame while its upper end is pivotally connected with the shifting head 26, and said lower arm having its upper end pivoted on said pin 32 and provided with an upward extension 34 which is yieldingly connected with said upper arm. This yielding connection in its preferred form comprises a tension rod 35 having its inner end guided in an opening 36 in the bracket 33 and its outer end is provided with an adjustable collar 37 while its intermediate part has a longitudinal slot 38 in which the upper arm moves freely but the central part of said extension is pivotally mounted therein by a pin 39. The upper arm and the extension of the lower arm are held yieldingly together by a spring 40 which surrounds the outer part of the tension rod and bears at its outer end against the collar 37 while its inner end bears against a sleeve 41 which slides on the tension rod and engages with the outer side of the upper lever. The rock lever is turned in a direction in which its upper arm swings outwardly and its lower arm inwardly by means of a spring 42 which surrounds the inner part of the tension rod and bears at its inner end against said bracket 33 while its outer end bears against a collar 43 which is adjustably secured to the tension rod, as shown in Figs. 2 and 4. The operative movement of the rock lever in which its upper arm moves inwardly and its lower arm outwardly is preferably effected by a rotary cam 44 which engages the lower arm of this lever. When the high part of this cam engages the lower lever arm the lever is moved in a direction for causing the shifting rod and fingers to move forward and shift an ear of corn transversely on the conveyer and toward the gage. If an unusual resistance should be encountered, as when striking the wings of the conveyer due to a disarrangement of the parts, then the operative or forward movement of the lower arm will continue independently of the upper arm while the latter is arrested, during which time the extension will move away from the upper arm and flex the spring 40. As soon as the obstruction to the inward or operative movement of the upper arm is removed the spring 40 will again restore the parts to their normal position. It will therefore be obvious that by this means breakage of any parts due to an obstruction or undue resistance to the forward stroke of the shifting rod and fingers or parts associated therewith is avoided, and that the parts automatically resume their normal position when the obstruction is eliminated.

In order to maintain the upper arm and said extension always in operative relation, these members are guided in a guideway formed between a guide arm 45 on the upper part of the bracket 33 and a retaining bar 46 secured to this guide arm, as shown in Figs. 1, 2 and 3.

47 represents a shaft journaled transversely in suitable bearings on the main frame and having sprocket wheels 48 secured thereto around which the chain belts of the longitudinal conveyer pass. This shaft serves as a driving shaft for the ear placing mechanism and thus serves as part of the means whereby the longitudinal conveyer and ear placing device are properly synchronized so that there will be no interference between the conveyer wings and the positioning fingers. With this end in view the driving shaft 47 is operatively connected with the cam 44 by means which comprise a driving sprocket wheel mounted on the driving shaft, a driven sprocket wheel 49 connected with the cam 44, and a chain belt 50 passing around said driving and driven sprocket wheels. The sprocket wheel 49 and the cam 44 are preferably formed in one piece and journaled on a pin 51 secured to the bracket 33. One of the stretches of this belt preferably passes around an idle sprocket wheel 52 which is adjustably secured to the main frame and thus permits of taking up slack in this belt.

For the purpose of accurately timing the movement of the conveyer and placing device relatively to each other, the driving sprocket wheel is divided into two sections 53, 54, the section 53 being plain and secured to the driving shaft 47 while the other section 54 is provided with peripheral teeth 55 which receive the chain belt 50 and is secured to the plain section so as to be capable of circumferential adjustment relatively thereto. This adjustment is preferably secured by providing the toothed section of the driving wheel on opposite sides of its axis with concentrically curved slots 56 which receive clamping bolts 57 secured to the plain wheel section 53. Upon loosening the bolts 57 the toothed section 54 and the plain section 53 may be turned relatively to each other for bringing the conveyer wings and the shifting fingers into the required relation. Instead of depending entirely on friction to hold the wheel sections 53, 54 in their proper relative position, this is supplemented by positively interlocking these sections. This is best accomplished by providing the opposing surfaces of the wheel sections 53, 54, with annular rows of radial serrations 58 which are interlocked with each other after the section has been turned into the proper relative position and thus aid the bolts 57 in maintaining this position.

I claim as my invention:

1. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member including a flexible element which permits said moving means to yield when encountering abnormal resistance.

2. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member comprising a rock lever having an upper arm which is connected with said shifting member, a lower arm and a flexible connection between said arms, and an actuating member engaging with said lower arm.

3. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member comprising a rock lever having an upper arm which is connected with said shifting member, a lower arm pivoted concentrically with said upper arm and provided with an extension arranged lengthwise of said upper arm, yielding means for connecting said upper arm and extension, and an actuating element engaging with said lower arm.

4. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member comprising a rock lever having an upper arm which is connected with said shifting member, a lower arm pivoted concentrically with said upper arm and provided with an extension arranged lengthwise of the upper arm, yielding means for connecting said upper arm and extension comprising a tension rod having one end slotted and receiving said upper arm and extension, a pin connecting said tension rod and extension, an inner collar slidable on the tension rod and engaging with the outer side of said upper lever arm, an outer collar secured to the outer part of said tension rod, and a spring surrounding said tension rod and engaging its opposite ends with said collars, and an actuating element engaging said lower arms.

5. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member comprising a rock lever having an upper arm which is connected with said shifting member, a lower arm pivoted concentrically with said upper arm and provided with an extension arranged lengthwise of the upper arm, yielding means for connecting said upper arm and extension comprising a tension rod having one end slotted and receiving said upper arm and extension, a pin connecting said tension rod and extension, an inner collar slidable on the tension rod and engaging with the outer side of said upper lever arm, an outer collar secured to the outer part of said tension rod, and a spring surrounding said tension rod and engaging its opposite ends with said collars, yielding means for turning said lever in one direction comprising a return rod connected with said extension and having a shoulder, a fixed guide for said rod and a spring interposed between said fixed guide and said shoulder, and a positive actuating member engaging with said lower arm.

6. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member comprising a rock lever having an upper arm which is connected with said shifting member, a lower arm and a flexible connection between said arms, an actuating member engaging with said lower arm, and a stationary guide for said upper arm and extension.

7. A butt remover comprising a cutter adapted to cut the butt ends of ears of corn, a longitudinally movable conveyer for moving said ears in a crosswise position past said cutter, and a positioning device for shifting said ears transversely relatively to said conveyer and cutter comprising a shifting member adapted to engage said ears and shifting means for moving said shifting member comprising a rock lever having an upper arm which is connected with said shifting member, a lower arm and a flexible connection between said arms, an actuating member engaging with said lower arm, and a stationary guide for said upper arm and extension comprising a bracket arranged on one side of said upper arm and extension, and a guide bar secured at its ends to said bracket and arranged on the opposite side of said upper arm and extension.

8. A butt remover comprising a cutter adapted to cut the butt ends of ears of corn, a longitudinally movable conveyer for moving said ears in a crosswise position past said cutter, a gage with which the ends of the ears of corn are engaged preparatory to advancing the same to said cutter, and shifting means for shifting said ears transversely relatively to said longitudinal conveyer and against said gage comprising a shifting rod capable of rotating and reciprocating horizontally and transversely relatively to said longitudinal conveyer, shifting fingers mounted on said rod and adapted to engage with said ears, a spring for yieldingly holding said rod and fingers in a position in which the latter are arranged in the path of said ears, and means interposed between said gage and rod for arresting the movement of said rod and fingers under the action of said spring.

9. A butt remover comprising a cutter adapted to cut the butt ends of ears of corn, a longitudinally movable conveyer for moving said ears in a crosswise position past said cutter, a gage with which the ends of the ears of corn are engaged preparatory to advancing the same to said cutter, and shifting means for shifting said ears transversely relatively to said longitudinal conveyer and against said gage comprising a shifting rod capable of rotating and reciprocating horizontally and transversely relatively to said longitudinal conveyer, shifting fingers mounted on said rod and adapted to engage with said ears, a spring for yieldingly holding said rod and fingers in a position in which the latter are arranged in the path of said ears, and means interposed between said gage and rod for arresting the movement of said rod and fingers under the action of said spring comprising a stop shoulder arranged on said gage and a stop arm secured to said rod and engaging said stop shoulder.

10. A butt remover comprising a cutter adapted to cut the butt ends of ears of corn, a longitudinally movable conveyer for moving said ears in a crosswise position past said cutter, a gage with which the ends of the ears of corn are engaged preparatory to advancing the same to said cutter, and shifting means for shifting said ears transversely relatively to said longitudinal conveyer and against said gage comprising engaging means which are adapted to engage the ears of corn and which are movable horizontally and transversely relatively to said longitudinal conveyer, and actuating means for said engaging means comprising a rotary cam which operates said engaging means, a driven sprocket wheel connected with said cam, a driving shaft, a driving sprocket wheel having two sections one of which is plain and secured to the driving shaft and the other adjustable circumferentially on the first mentioned section and provided with sprocket teeth, and a chain belt passing around the toothed section of the driving sprocket wheel and said driven sprocket wheel.

11. A butt remover comprising a cutter adapted to cut the butt ends of ears of corn, a longitudinally movable conveyer for moving said ears in a crosswise position past said cutter, a gage with which the ends of the ears of corn are engaged preparatory to advancing the same to said cutter, and shifting means for shifting said ears transversely relatively to said longitudinal conveyer and against said gage comprising engaging means which are adapted to engage with the ears of corn and are movable transversely and horizontally relatively to the longitudinal conveyer, a rock lever operatively connected at one end with said engaging means, a rotary cam engaging the opposite end of said lever, a driven sprocket wheel connected with said cam, a driving shaft, a driving sprocket wheel having a plain section connected with said shaft and a toothed section provided with circumferentially curved slots, the opposing sides of said sprocket wheel sections being provided with co-operating radial serrations, clamping bolts connected with said plain sprocket wheel section and passing through the slots of said toothed section, and a chain belt passing around said toothed wheel section and said driven sprocket wheel.

OGDEN S. SELLS.